United States Patent
Kroot et al.

(10) Patent No.: US 11,026,405 B2
(45) Date of Patent: Jun. 8, 2021

(54) CONTAINER BASE, CONTAINER SEGMENT, CONTAINER COVER AND CONTAINER ASSEMBLY FOR HOLDING LIVE POULTRY AND METHOD FOR LOADING AND UNLOADING SUCH A CONTAINER ASSEMBLY

(71) Applicant: MAREL STORK POULTRY PROCESSING B.V., Boxmeer (NL)

(72) Inventors: Marcus Marinus Gerardus Kroot, Sint Anthonis (NL); Marc Johan Halfman, Zeddam (NL); Roger Pierre Hubertus Maria Claessens, Nijmegen (NL); Wilbert Hiddink, Varsseveld (NL); Nicky Wilhelmus Johannes Hendrikus De Jong, Druten (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 439 days.

(21) Appl. No.: 15/521,385

(22) PCT Filed: Oct. 21, 2015

(86) PCT No.: PCT/NL2015/050728
§ 371 (c)(1),
(2) Date: Apr. 24, 2017

(87) PCT Pub. No.: WO2016/064270
PCT Pub. Date: Apr. 28, 2016

(65) Prior Publication Data
US 2017/0303514 A1    Oct. 26, 2017

(30) Foreign Application Priority Data

Oct. 23, 2014  (NL) .................................... 2013674
May 1, 2015  (NL) .................................... 2014757

(51) Int. Cl.
    *A01K 31/00*     (2006.01)
    *A01K 45/00*     (2006.01)
    *A01K 31/07*     (2006.01)

(52) U.S. Cl.
    CPC ............ *A01K 31/002* (2013.01); *A01K 31/07* (2013.01); *A01K 45/005* (2013.01); *A01K 31/00* (2013.01); *A01K 45/00* (2013.01)

(58) Field of Classification Search
    CPC .................................................. A01K 31/002
    See application file for complete search history.

(56) References Cited

FOREIGN PATENT DOCUMENTS

| EP | 0326422 A2 | 8/1989 |
|---|---|---|
| EP | 0384530 A1 | 8/1990 |

(Continued)

OTHER PUBLICATIONS

International Search Report for corresponding International PCT Application No. PCT/NL2015/050728, dated Feb. 1, 2016.

(Continued)

*Primary Examiner* — Jesssica B Wong
(74) *Attorney, Agent, or Firm* — Workman Nydegger (57) ABSTRACT

The present invention relates to a container base for holding live poultry, a container segment for holding live poultry that can be stacked onto such a container base, and a container cover as well as to a container assembly for holding live poultry, comprising such a container base and at least one such container segment placed on top of the container base. Furthermore the invention also relates to a method for loading the container assembly according the present invention.

21 Claims, 8 Drawing Sheets

(56) References Cited

FOREIGN PATENT DOCUMENTS

| EP | 0546925 | A1 | 6/1993 |
|---|---|---|---|
| EP | 1308091 | A2 | 5/2003 |
| FR | 2818619 | A1 | 6/2002 |

OTHER PUBLICATIONS

Netherlands Search Report for corresponding Netherlands Application No. 2013674, dated Jun. 24, 2015.
Netherlands Search Report for corresponding Netherlands Application No. 2014757, dated Jul. 13, 2015.
"The Successful Stork GP Container Supply System," Poultry International, Nov. 30, 1991, pp. 14-15, vol. 30, No. 13, Watt Publishing Co, Mount Morris, Illinois, US.

CONTAINER BASE, CONTAINER SEGMENT, CONTAINER COVER AND CONTAINER ASSEMBLY FOR HOLDING LIVE POULTRY AND METHOD FOR LOADING AND UNLOADING SUCH A CONTAINER ASSEMBLY

BACKGROUND

The present invention relates to a container base for holding live poultry, a container segment for holding live poultry that can be stacked onto such a container base, a container cover to screen off a container segment as well as to a container assembly for holding live poultry, comprising such a container base, at least one such container segment placed on top of the container base and a container cover placed on top of the upper container segment. Furthermore the invention also relates to a method for loading the container assembly according the present invention.

During storage and transport of poultry (for instance on a poultry farm, from a poultry farm to another poultry farm, on a transport vehicle, from a poultry farm to a slaughterhouse or on a slaughterhouse) the poultry is usually held or transported alive in poultry holders. One such poultry holder is normally designed to hold plural animals in the order of magnitude of a dozen or several dozen of animals. These poultry holders are also referred to as "pallets", "crates", "cages" or "containers". For easy logistics a plurality of such poultry holders may be combined in a shared support structure that makes it possible to stack the poultry holders compact and to displace a support structure with the several holders as a single unit. A support structure may consist of a steel frame in which a number of poultry holders are held in stacked (multilayer) manner and from which the poultry holders can be wholly or partially removed, and can thus for instance be embodied such that they can slide optionally fully into and out of the support structure, similarly to drawers in a chest of drawers. Another possibility is to integrate the containers with the support structure so that this latter comprises compartments provided with individually controllable closing means.

SUMMARY

It is an object of the present invention to provide an alternative solution for combining plural poultry holders that enhances the poultry holding capacity/volume ratio and/or that enhances the weight/surface ratio of a number of stacked poultry holders. Furthermore it is an object of the invention to provide a solution for enhanced flexibility in the storage and transportation of live poultry.

The invention provides for this purpose a new and inventive container base, a container segment, a container cover and a container assembly for holding live poultry composed from one or more container bases, one or more container segments and a container cover. In this respect the container assembly is a stack of a container base according the present invention on top of which container base one or more container segments, also according the present invention, are placed (stacked) and on the top container segment a cover according the invention is placed to shield off the top container segment. In practise often use will be made of a container base, on top of which subsequently four (or five) container segments are placed and on the top of which container segments a cover is placed. However also larger or smaller assemblies may be applied. It is even possible to put together an assembly of a container base on which base are one or more container segments stacked where upon again a container base is stacked on top of which one or more subsequent container segments may be stacked of which the upper most container segment is carries the cover. For instance a practical stack-size for loading or unloading may be a base with four container segments while a transport facility (e.g. a truck) may allow to pile up two of such "five layered" assembles to result in a "ten layered" transport assembly configuration (including two container bases; one at the bottom and one at the sixth layer from below and carrying the cover on top). The flexibility of stacking enables to optimise various process wherein the container assemblies are used (e.g. loading, transporting, unloading, cleaning, storage and so on). As will be apparent from the subsequent description the stability of an assembly may be provided by the container base, which enables to choose for a lighter construction of the container segments.

The invention provides for this purpose a container base for holding live poultry, comprising: two mutual first side walls formed by two parallel sockets, which sockets are both provided with at least one open end side; two mutual parallel second side walls connecting on opposite sides to the two parallel sockets; and a bottom wall connected to the sockets and the side walls, such that the sockets and the side walls are protruding from the bottom wall to surround a poultry holding volume. An advantage of such container base is that it makes a support for further poultry holders that provides strength so that one or more subsequent poultry holders (or as they will be addressed later in this description "container segments") to be stacked onto this container base can be of a lighter construction; the strength of the total construction may be provided for a substantial part by the container base thus the poultry holders on top of the container base may be of a lighter construction. A further advantage of the container base is that it pairs the ability of being stable and being handled by the forks of a fork-lift truck with the ability of holding live poultry between the sockets that are provided to feed the forks in. The container base according the present invention thus enhances the use of the available volume for the transportation of live poultry; except the volume that is required for the sockets and the further walls all the rest of the volume of the container base is utilised as poultry holding volume.

The sockets may be designed and dimensioned for the insertion of lifting forks. This enables handling of the container base according the invention with logistic equipment that is actually also available for handling prior art container bases. When the sockets are be constructed of metal this provides a solid construction that is useful in the rough conditions wherein the container bases are often used. However also alternative materials for constructing the sockets is an option, like for instance (reinforced) engineering plastics. To enable access to lifting forks from several sides of the container base the sockets may be provided with dual open ended sides and/or the second side walls may be formed by two parallel sockets.

The open ends (entrances) of the sockets may be provided with bevelled (chamfered) guide surfaces. The bevelled guide surfaces facilitate an easy entry of the lifting forks in the sockets. A bevelled guide surface on the entrance underside of the sockets has the additional advantage that the sockets are above the floor and will thus less pollute with dirt of the floor (like for instance poultry excrements). A bevelled guide surface on the entrance top of the sockets has the additional advantage that the lifting forks will less likely contact a container segment that is placed on top of the container base. Typically the height of the bevelled guide surfaces is 40-70 mm. Apart from bevelled guide surfaces on the underside and on the top of the sockets also bevelled guide surfaces may be provided on the sides (sidewalls) of the sockets. As to limit the top surfaces of the sockets carrying dirt also the top surfaces may be bevelled so to enable dirt on top of the sockets easy to remove or to slide off automatically.

The bottom wall has to be constructed such that it is a closed floor for the live poultry to be held, but apertures for ventilation and/or the passage of poultry droppings may be included. The top side of the container base may be opened (open top side) to enable live poultry to be loaded in the container base. Furthermore the height of all the side walls protruding from the bottom wall may correspond so to enable easy stacking of other items on top of the container base. To even further enhance the ability of carrying items on top of the container base the side walls faces away from the bottom may be provided with a support edge for carrying items.

For ventilation purposes of the live poultry held by the container base the bottom wall and/or at least one of the side walls may be air permeable, which can be realised by providing one or more of the walls with apertures or a pattern of apertures. For efficient use of an available space (e.g. the transportation volume of a truck) the bottom surface of the container base may be substantial rectangular, which may be realised when the first and second side walls are perpendicular connected. Furthermore a substantial rectangular construction of side walls may be may advantageous. A further addition to the container base may be the provision of (low) legs to keep a substantial part of the container base free from the underground it is resting on. To enable easy and animal friendly loading of the container base one of the (longer) sidewalls may locally be lowered as will subsequently be explained in relation to the container segment according the present invention.

In a further embodiment of the container base the sidewalls may locally, more especially adjoining the corners of the container base, be provided with an inward set back wall parts. These inward set back wall parts may gradually sloping inward from the bottom, but the inward set back wall parts may also set back in a non-gradual configuration. The advantage of the inward set back wall parts is that they enable access to the underside of an element (e.g. a container segment) stacked onto the container base. Such easy access to the underside of an element facilitates easy stacking and unstacking of a container assembly as will be discussed in more detail below.

As to provide additional support to elements stacked onto a container base also additional support surfaces me be provided on the upper wall sides of the side walls of the container base.

The present invention also provides a container segment for holding live poultry, comprising: a bottom wall and four side walls protruding from the bottom wall;

wherein the container segment is provided with a door, which door is formed by a section of one of the side walls and a, with the side wall section connected, section of the bottom wall, which door is moveable connected with the rest of the container segment such that the door is displaceable between a position wherein the door fits the rest of the container segment and a position wherein the door leaves an opening in the side wall and the bottom for the passage of poultry. The door formed by a section of one of the side walls and a therewith connected section of the bottom wall provides a relative stable structure of the container segment as at least three of the side walls may be constructed as uniform (solid) construction elements. Furthermore the door is due to its "single side wall construction" relatively easy to control and may be handled with a single hand. The door of the container segment according the present invention may also be used in circumstances wherein one or both of the sides of the container segment are resting against other items (e.g. another container segment). By opening the door, that means by bringing the door in a position wherein the door leaves an opening in the side wall and the bottom for the passage of poultry, poultry may be loaded to a portion below the opened container segment. In case the container segment is stacked onto another segment in such case the lower container segment may be loaded with live poultry when de door of the higher container segment is opened and the door of the lower container segment is closed.

In an embodiment the side wall section of the door of the container segment may be provided with a least one coupling part that cooperates with the side wall parts of the rest (fixed) of the container segment. For this purpose the side wall parts of the rest (fixed) of the container segment may be provided with at least one counter-coupling segment. The advantages of at least one, or even better two, cooperating coupling and counter coupling parts is that this provides additional strength to the container segment in a position wherein the door is closed. Especially a coupling construction providing a form fitting coupling between the door and the rest of the container segment may result in a substantial increase of the integrity of the container segment in the "closed door situation".

To provide enough passage space if the live poultry the width of the door may be at least 50% of the corresponding width of the side wall wherein the door is installed, but such minimal width may also be at least 60% or at least 70%. Accordingly the depth of the bottom wall section of the door may at least 50% of the corresponding depth of the container segment, but such minimal depth may also be at least 60%, at least 70% or at least 80%. The dimensions are chosen such that the total surface of the bottom section of the door is at least 40% (or at least 50%, at least 60% or even at least 70%) of the total bottom wall surface of the container segment. Such a minimal total surface of the bottom section of the door provides the live poultry enough space to be loaded without hindrance or negative influence on the animal welfare. The height of the door part that forms in the closed situation a section of one of the side walls may have a height in accordance with the height of the sidewall is a part of, however the height may also be 10-50 mm less than the height of the sidewall is a part of. The advantage of the door part that forms in the closed situation a section of one of the side walls having a reduced height compared to the height of the side wall that it is a part of is that when closing the door poultry (especially poultry heads) are not stuck between the upper edge of the door and a the bottom of a subsequent container segment stacked on top of it. These advantages correspond with the advantages of the locally lowered (longer) sidewall of the container base as may be provided in an embodiment of the container base according the present invention. A further advantage of such a (lowered) door construction is that it enables the opening of a door of a container segment even if there is no space left free above the container segment of which the door has to be opened.

The door may be centrally located in the side wall wherein the door is installed. This provides a balance in the strength of the container segment. Furthermore the height of the door may correspond to the height of the side wall wherein the door is installed, such that in a closed door situation the side walls including the door uniformly surround the poultry holding volume. Also the side walls protruding from the bottom wall may correspond in height so to enable easy stacking of another container segment on top of the container segment. For easy stacking the side walls faces away from the bottom may also be provided with a support edge for carrying an upper part as well as that the bottom side facing away from the side walls may be profiled to hold the top side of the walls from an underlying container segment or a container base according the present invention. For enhanced robustness and user-friendliness the container segment may be provided with rounded off corners.

As for to movability of the door the door may be slideable connected with the rest of the bottom wall, in which case the rest of the bottom wall may be provided with the door holding guides. In case the bottom section of the door has plural segments (e.g. at least two telescopic door bottom segments) the slideable segments may also be constructed such that they overlap in an opened position of the door. As an alternative for a slideable door the door may also be hingedly connected with the rest of the bottom. As a further preferred alternative the bottom section of the door may have plural segments; one of which rotatable/hinged with another segment and the combined segments being slideable connected to the rest of the bottom wall. Using such construction the segments may in a single smooth movement be "folded" together and subsequently the folded together segments may be shifted backwards. Such construction may not only easy to be handled in opening and losing but also enables to provide a relative large door opening in the bottom wall of the container segment without a voluminous opened door being of hindrance.

To provide the live poultry stored in the container segment air the bottom wall and/or at least one of the side walls may be air permeable. Such air permeability may be realised by providing the walls and/or the bottom with e.g. apertures or a pattern of apertures. The container segment may mainly or completely be constructed of plastic, but also metal construction elements may be incorporated. For instance a metal (e.g. RVS) reinforcement structure may be incorporated in a plastic outer shell. Especially at the border of the aperture in the bottom wall that is provided to receive the door a metal construction (like for instance a metal frame work) may be included as especially this border may be a weaker part of the construction. The metal reinforcement structure may also connect to one or more support structures that may be incorporated in the container segment for carrying the weight of structures stacked on top of the container segment.

Also in an embodiment of the container segment the sidewalls may locally, more especially adjoining the corners of the container segment, be provided with an inward set back wall parts in line with an embodiment of the container base also provided with inward set back wall parts. Also here the inward set back wall parts may gradually sloping inward from the bottom or set back in a non-gradual configuration and—again—the advantage of such feature is that that they enable access to the underside of an element (e.g. a further container segment od or a container cover) stacked onto the container base. Such easy access to the underside of an element to facilitate easy stacking and unstacking of a container assembly.

As to provide additional support to elements stacked onto a container element also additional support surfaces me be provided on the upper wall sides of the side walls of the container element.

In a further embodiment of the container segment the bottom wall of the container segment may be provided with a structure of ridges that facilitates the loading and offloading of poultry by including guide structures that lead from a location close to the door to the side walls faced away from the door. The bottom wall may for instance be provided with fanning out ridges (ribs). Furthermore (linear) guide structure of the door may be incorporated in raised bottom wall parts (ridges) to enable (pure) horizontal siding of the door over a certain distance and also providing additional "grip" to the poultry held by the container segment. Yet a further advantage of locally raised bottom wall parts like ridges is that such structure may provide additional strength to the bottom wall. This also helps to lower the price if the bottom wall as it may facilitate the construction of the bottom wall (at least partially) from a plastic material.

The present invention also provides a container cover to screen off a container segment. To use the holding volume the top container segment of a stack (pile) of a container base and one or more container segments the top container segment may be closed off with a container cover. Such container cover plate may be a single element plate (e.g. from plastic) but it is also possible to embody the cover plate as a multiple slideable segmented plate with the elements moveable connected with each other. The advantage of a slideable segmented container cover is that it may be opened and closed without the requirement of space above the container cover (as the opening and/of closing takes place more or less in a single plane) which is especially advantageous on the top of a container assembly as there is often few space left, e.g. when a truck is to be loaded with a container assembly it is efficient to use as much of the available transportation volume as possible.

In an embodiment of the container cover the container over is provided with corner apertures that enable to stack and position the container cover relative to an underlying container segment. The apertures in the container cover however prevent further stacking of subsequent container segments or a container base on top of the cover.

The present invention also provides a container assembly for holding live poultry, comprising a container base and at least one container segment, both according the present invention, the at least one container segment being placed on top of the container base. An advantage of such container assembly is that the height/capacity of the assembly may be selected dependent on actual circumstances. For instance dependent on the transport volume the height of the assembly (thus the number of container segments stacked onto a container base) may be optimised. The container assembly may comprise at least two container segments, a first container segment placed on top of the container base and subsequent container segments on top of an underlying container segments. However in practise it is expected that more often container assemblies with four or five container segments will be used. Different from the prior art support structures use in a container assembly in the present container assembly the frame is an integrated part of the container base and the container segments. Due to the use of the container base for holding poultry and the absence of a support structure the poultry holding efficiency may be enhanced with 5-10% compared to standard prior art live poultry holding solutions.

Finally the present invention also provides a method for loading a container assembly according the present invention, comprising the method steps: A) placing an empty container segment on an empty container base; B) placing one or more subsequent empty container segments on a top empty container segment; C) placing the doors of all the container segments stacked onto the container base in the position wherein the doors leave an opening in the side walls and the bottoms of the stacked empty container segments for the passage of poultry; D) loading live poultry through the opening in the side walls and the bottoms of the stacked container segments into the container base; E) placing the door of the lower container segment in the position wherein it fits the rest of the container segment; F) loading live poultry through the remaining opening in the side walls and the bottoms of the container segments in the lower container segment with the closed door; G) repeating the method steps E) and F) until all the doors of the container segments are closed and the container segments are loaded with live poultry; and H) closing off the upper container segment. The method may furthermore also comprise the method steps: J) loading live poultry in the upper container segment; and K) placing a cover on the loaded upper container segment. The opening and closing of the doors may single-handed be executed enabling a single person to handle the complete loading as one hand is to be used for manipulating the doors while second hand is available to guide the live poultry in the base and segments. The method according the invention enable sound ergonomic single operator loading of live poultry holders which also leads to substantial limitation of loading efforts and thus also loading expenses compared to the prior art loading techniques.

The doors may be opened (according processing step C) before stacking the container segments (according processing step B) but it is also possible to open one or more of the doors of the container segments before stacking them (according processing step B). Closing off the upper segment after being loaded with live poultry may be realised by placing a single lid or a segmented container cover on top of the upper segment but it is also possible to place a partially opened container cover on the upper segment before or during the loading of the upper segment and closing off the partially opened cover after loading the upper segment. The container cover may be provided with apertures to enable stacking a next container base on to a covered container segment without the carrying the weight of the container base lying on top. The apertures may be located such that a weight carrying support structure of a container segment is not covered by the container cover so that the weight carrying support structure is free to directly contact a container base stacked on top of the container segment. The container cover may also be constructed so that it is impossible to place a container cover in between two container segments or in between a container base and a stacked onto that container base container segment; the only option that may be provided by the dedicated shape of the container cover is that a container base is stacked onto a lid.

BRIEF DESCRIPTION OF THE DRAWINGS

The invention will be further elucidated herein below on the basis of the non-limitative exemplary embodiments shown in the following figures. Herein.

DETAILED DESCRIPTION OF VARIOUS EMBODIMENTS

Figure 1A:
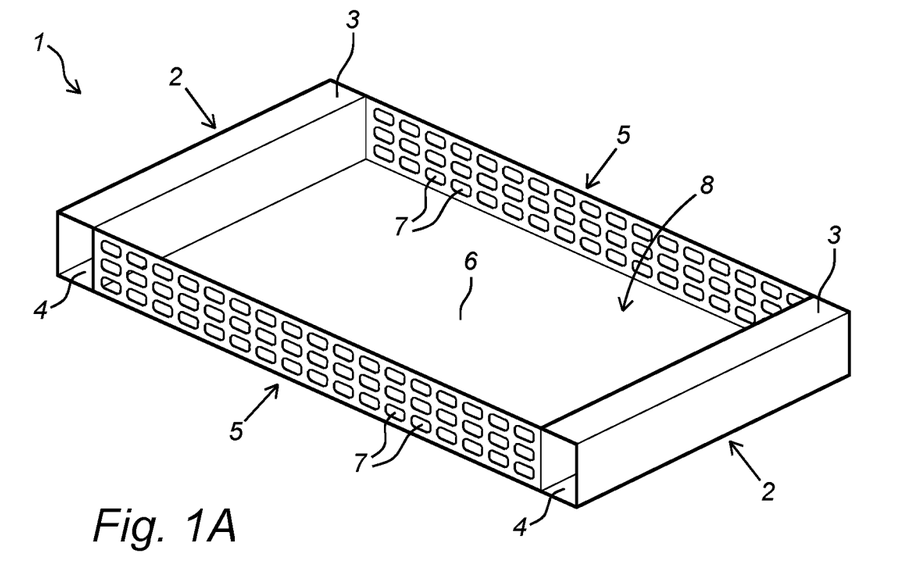
FIG. 1A shows a perspective schematic view of a container base according the present invention.

FIG. 1A shows a container base 1 for holding live poultry, having two first side walls 2 formed by two parallel sockets 3 wherein openings 4 are provided for handling the container base 1. The first side walls 2 are both connected with two parallel second side walls 5, together forming a substantial rectangular "fencing" that surrounds a poultry holding volume 6. In the second side walls 5 apertures 7 are provided for aeration/ventilation of the poultry holding volume 6. Furthermore a bottom wall 8 is connected to the first and second side walls 2, 5.

Figure 1B:
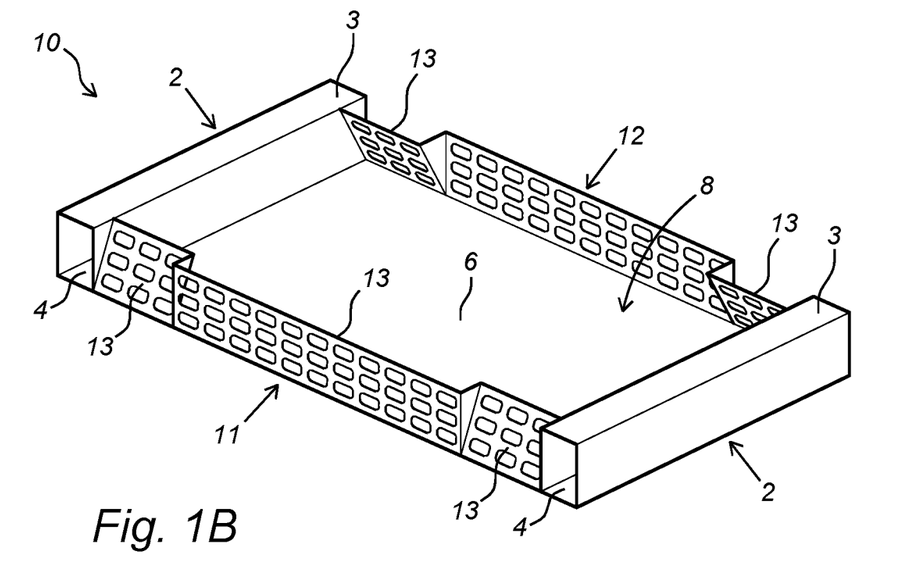
FIG. 1B shows a perspective schematic view of an alternative embodiment of a container base according the present invention.

FIG. 1B shows an alternative container base 10 which also has side walls 2 formed by two parallel sockets 3 wherein openings 4 are provided. Together with two parallel second side walls 11, 12, a bottom 8 and the side walls 2 a poultry holding volume 6 is surrounded. The side wall 11 is locally lowered 13 to facilitate easy and animal friendly loading of the container base 10. Furthermore the side walls 11 and 12 are provided with inward set back wall parts 13. These inward set back wall parts 13 are gradually sloping inward from the bottom 8 and give easy access to the bottom of an element to be stacked onto the container base 10.

Figure 1C:
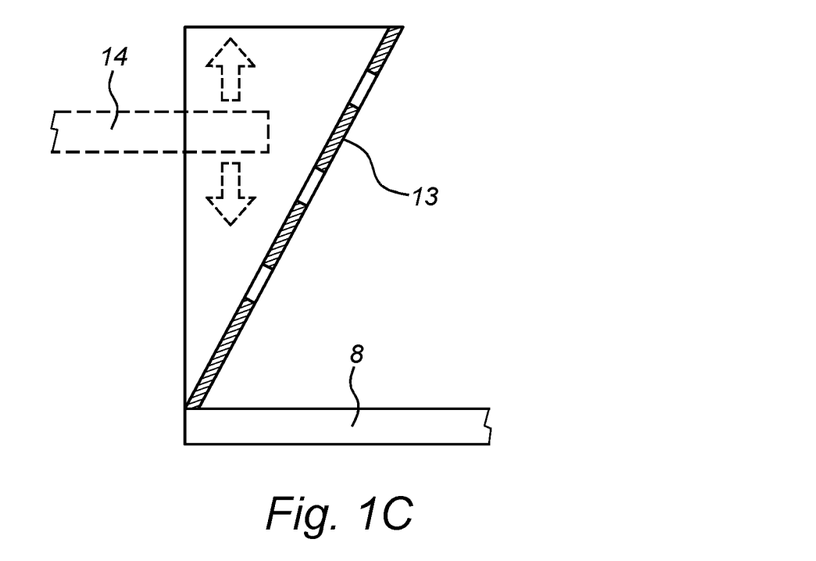
FIGS. 1C and 1D show cross sections of a wall part of a the container base according the present invention.
Figure 1D:
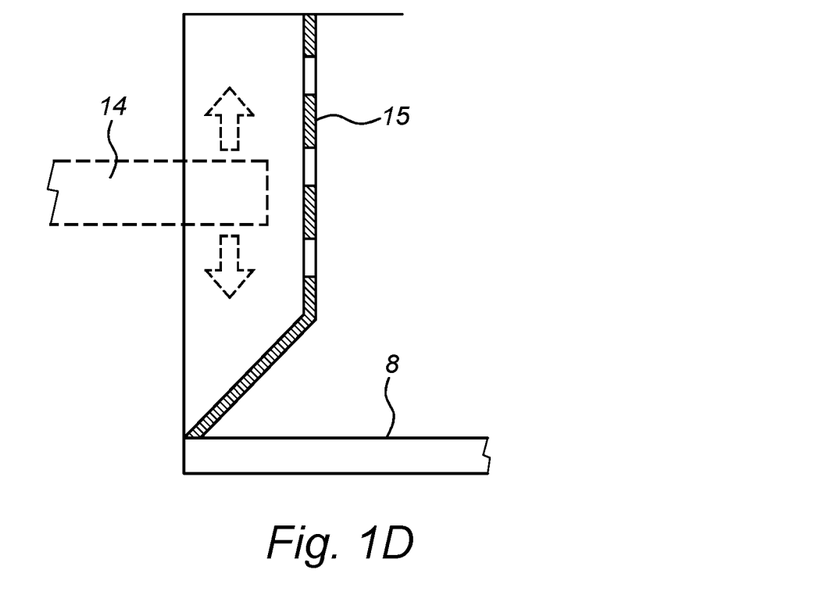

In FIG. 1C a cross sections of a wall part 13 of the container base 11 is shown including a dotted represented carrying element 14 as my be used for stacking and/or unstacking elements on top of the container segment 11. FIG. 1D shows an alternative cross section of a wall part 15 of the container base which wall part is set back in a non-gradual configuration but that also enables a carrying element 14 to be moved underneath a elements on top of the container segment including the wall part 15.

Figure 2A:
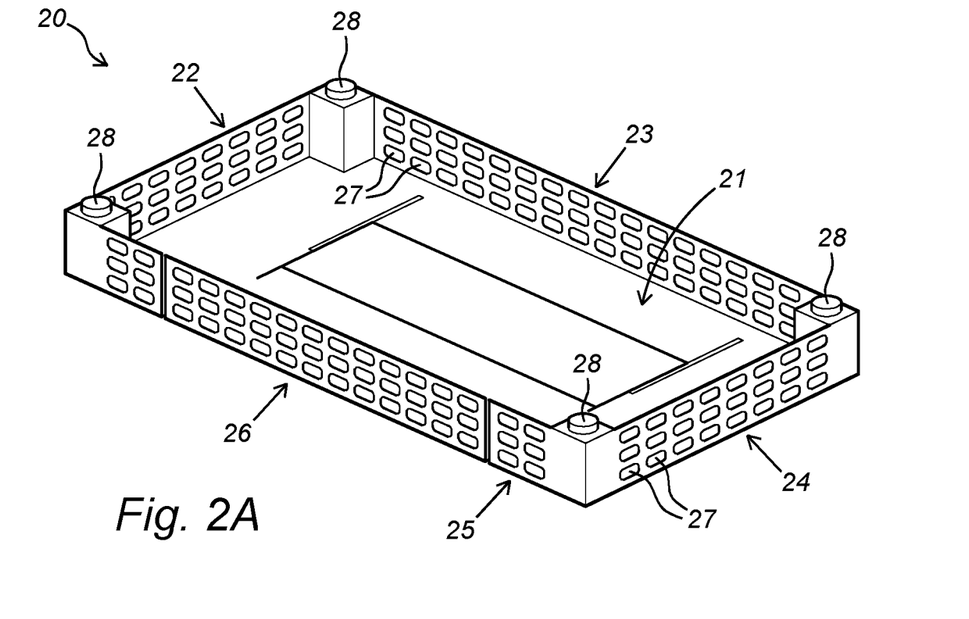
FIG. 2A shows a perspective schematic view of a container segment according the present invention.

FIG. 2A shows a container segment 20 for holding live poultry, with a bottom wall 21 and four side walls 22-25 protruding from the bottom wall 21. A door 26 formed by a section of one of the side walls 25 and a section of the bottom wall 21. As will be demonstrated in the FIG. 3A-3C the door 26 is dual sectioned and displaceable between a position wherein the door 26 fits the rest of the container segment, which is the situation shown in FIG. 2, and a position wherein the door leaves an opening in the side wall 25 and the bottom wall 21 for the passage of poultry. The side walls 22-25 of the container segment 20 are provided with apertures 27 for aeration/ventilation. Furthermore the container segment 20 has support columns 28 for carrying the weight of structures that can be stacked onto the container segment 20.

Figure 2B:
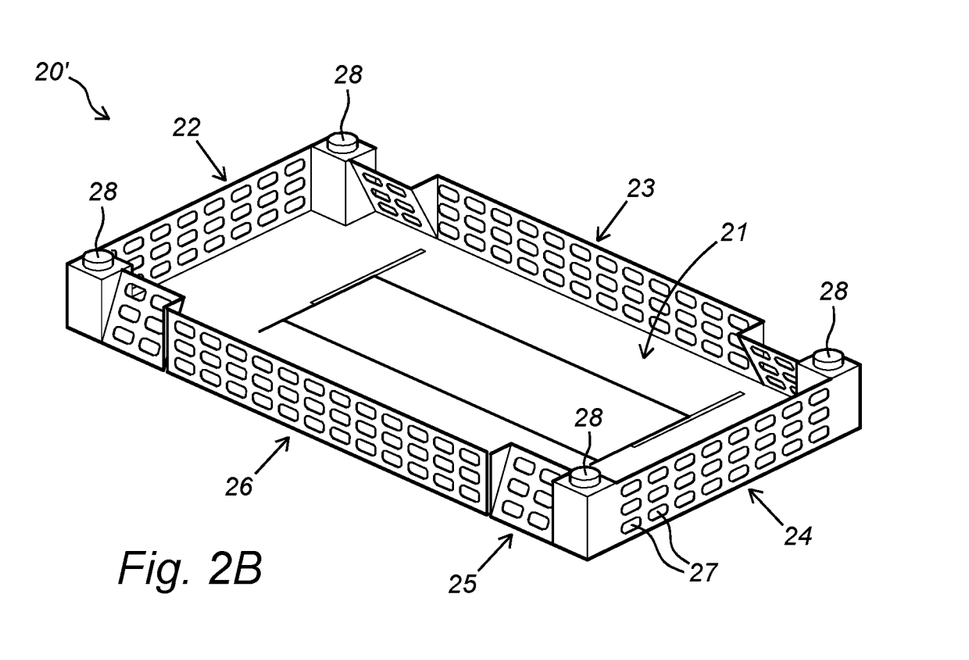
FIG. 2B shows a perspective schematic view of an alternative embodiment of a container segment according the present invention.

FIG. 2B shows a container segment 20' wherein the side walls 23, 26 are provide with inward set back wall parts 29 that are gradually sloping inward from the bottom of the container segment 20' and thus provide access to the bottom of an element to be stacked onto the container element 20' in line with the access provided by the alternative container base 10 as shown in FIG. 1B.

Figure 2C:
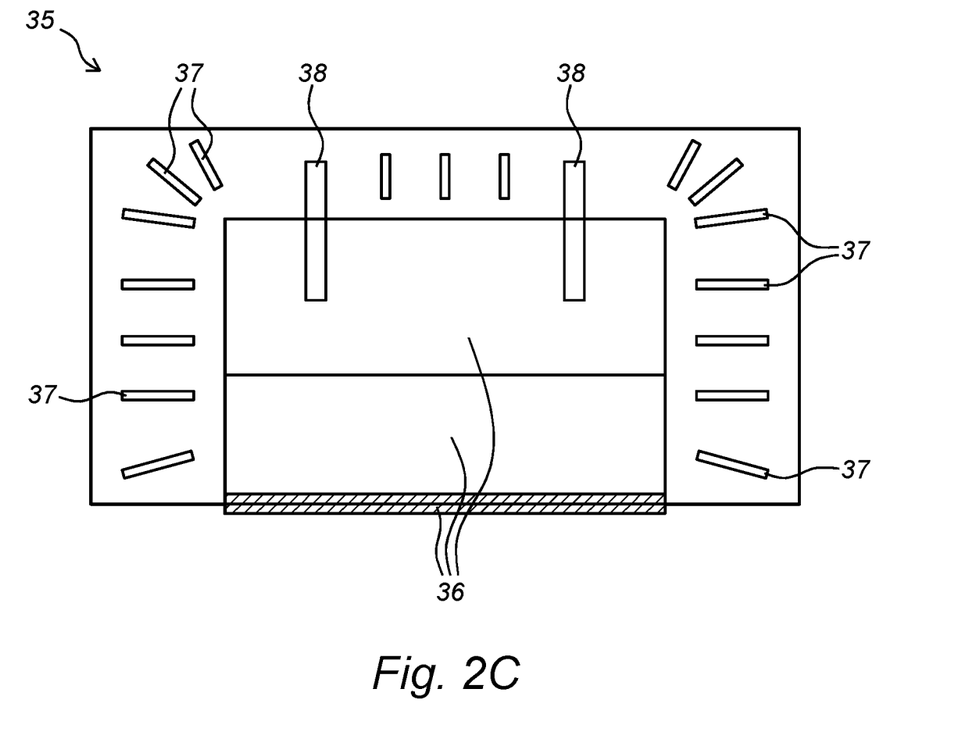
FIG. 2C shows a top view on a bottom of a container segment.

FIG. 2C shows a top view on a bottom 35 of a container segment having a door 36 surrounded by a bottom part provided with a structure of ridges 37 that facilitates the loading and offloading of poultry so as to "guide" the poultry to or from the door 36 during loading or unloading of a container segment. The ridges 37 are fanning out ridges (ribs). Furthermore (linear) guide structure of the door 36 are incorporated in raised bottom ridges 38 that to enable horizontal siding of the door 36 and that providing additional "grip" to the poultry supported by the bottom 35.

Figure 3A:
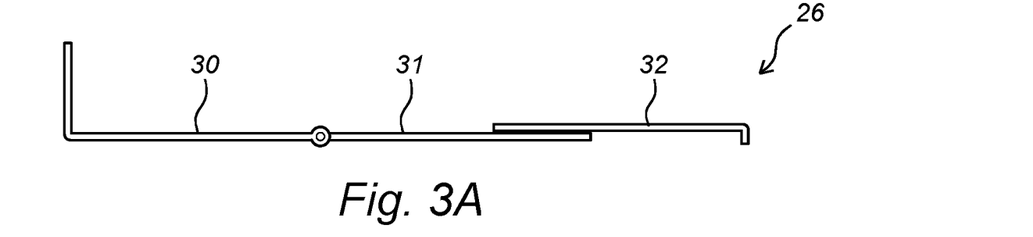
FIGS. 3A-3C shows a schematic side view of a door of the container segment according FIG. 2 in various positions.
Figure 3B:
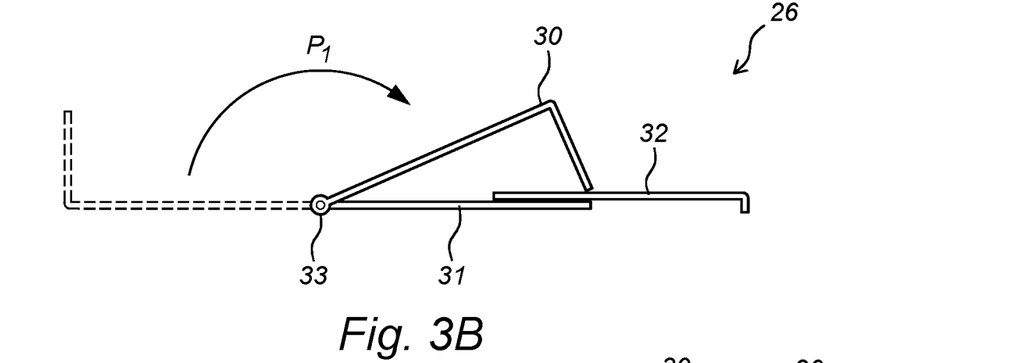
Figure 3C:
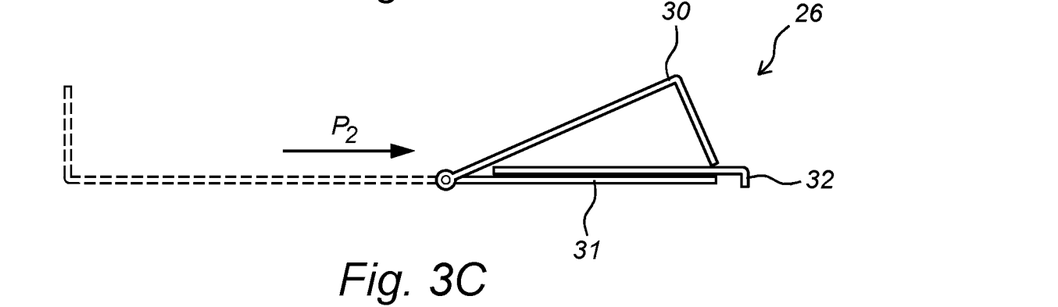

FIG. 3A shows a schematic side view of the door 26 of the container segment 20 as shown in FIG. 2. In the position shown in this figure a wall section 30 of the door 26 is place in line with a sliding door section 31 such that the door 26 fits the bottom wall 21 and the rest of the side wall 25 of the container segment 20 (see FIG. 2). Also depicted in this figure is a guide 32 that holds the sliding door section 31. Now in FIG. 3B the position of door 26 is changed from its initial closed position shown in FIG. 3A to a semi-opened position by pivoting the wall section 30 of the door 26 according arrow $P_1$ around a hinge 33 to a position wherein the door 26 is half opened. In FIG. 3C position of door 26 is further changed from its half opened position (FIG. 3B) to a fully opened position by shifting the sliding door section 31 of the door 26 according arrow $P_2$ in the guide 32. The door 26 as depicted in FIG. 3C in a fully opened position which enables the passage of live poultry (not shown).

Figure 3D:
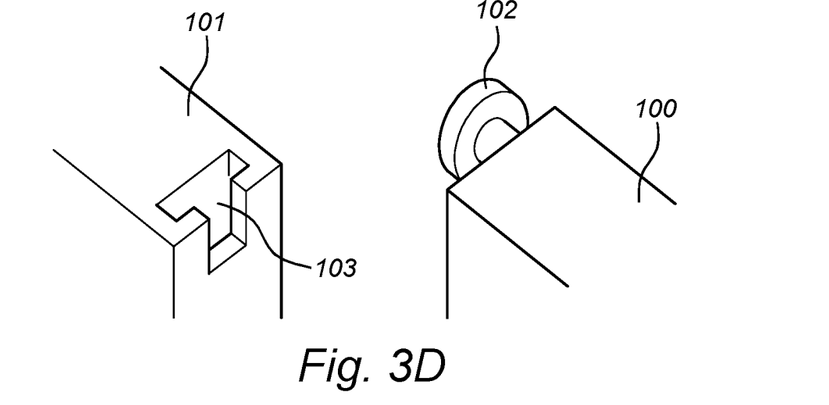
FIG. 3D shows a perspective view on a coupling construction of a door of the container segment with the rest of the container segment.

FIG. 3D shows a coupling construction of a side wall section 100 of a door of a container segment with a rest part 101 of a container segment. The side wall section 100 is provided with a coupling knob 102 that cooperates with a corresponding opening 103 in the side wall part 101 of the rest (fixed) of the container segment to provide a form fitting coupling in the "closed door situation".

Figure 4A:
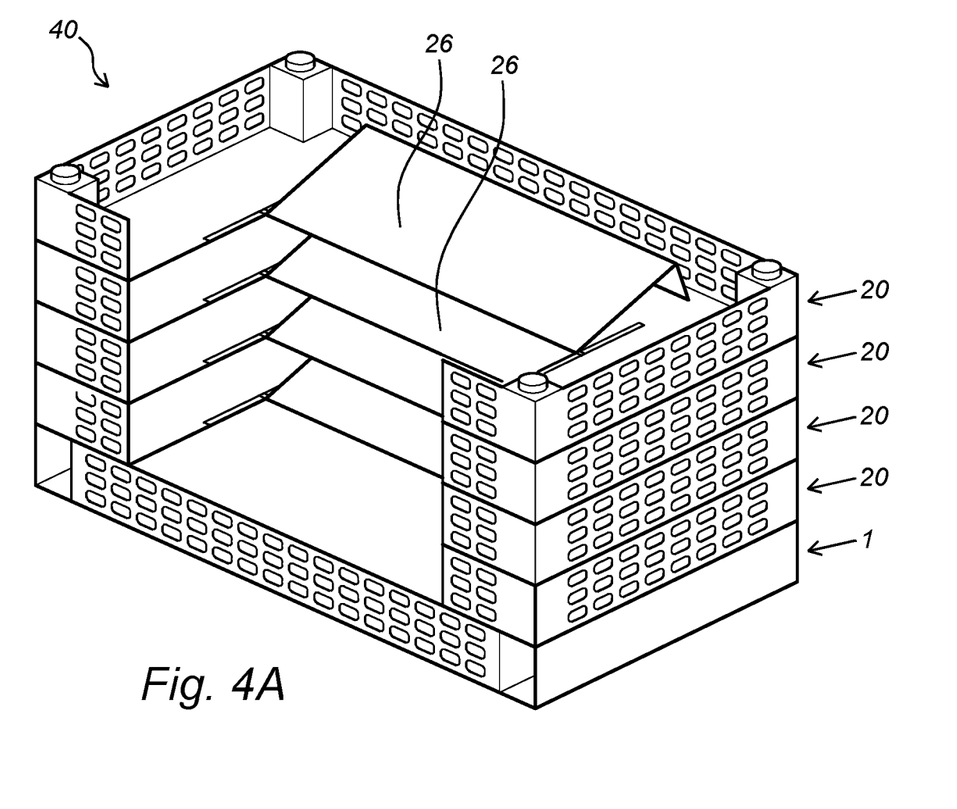
FIG. 4A shows a perspective schematic view of a container assembly according the present invention.

FIG. 4A shows a perspective schematic view of a container assembly 40 wherein on a container base 1 as shown in FIG. 1 subsequently four container segments 20 as shown in FIG. 2 are stacked. The doors 26 of all the container segments 20 are in the opened position (see FIG. 3C) so to enable the loading of the container base 1 with live poultry. After the container base 1 is loaded the door 26 of the lower container segment 20 may be closed (to the position as depicted in FIG. 3A). Now the lower container segment 20 may be loaded and this procedure may be repeated until all the container segments 20 are loaded.

Figure 4B:
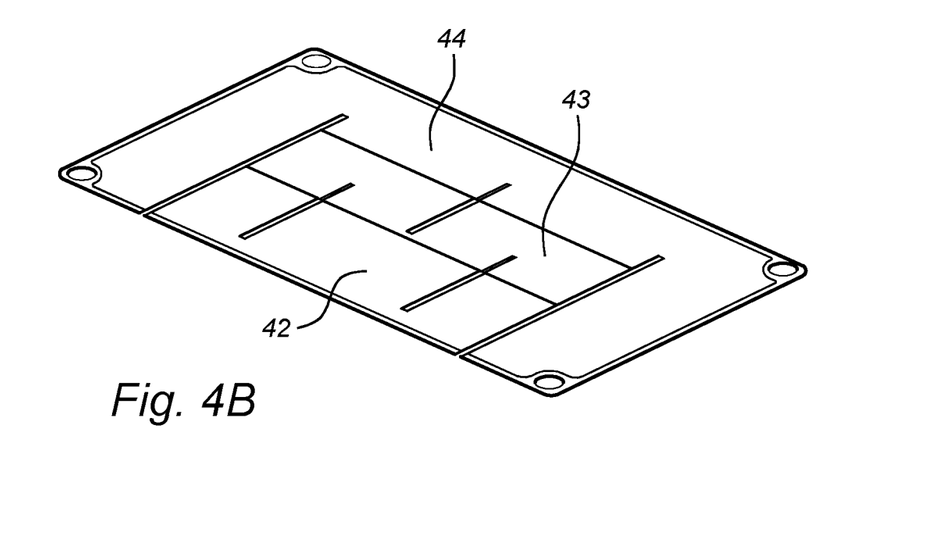
FIG. 4B shows a perspective schematic view of a container cover.

After or during loading of the top container segment 20 a container cover 41 as shown in FIG. 4B may be placed on the top container segment 20. The container cover 41 is a multiple slideable segmented plate with the three elements 42, 43, 44 linear moveable connected with each other. The container cover 41 is also provided with corner apertures 45 that enable to stack and position the container cover 41 relative to an underlying container segment. The apertures 45 prevent further stacking of subsequent container segments or a container base on top of the container cover 41.

Figure 5A:
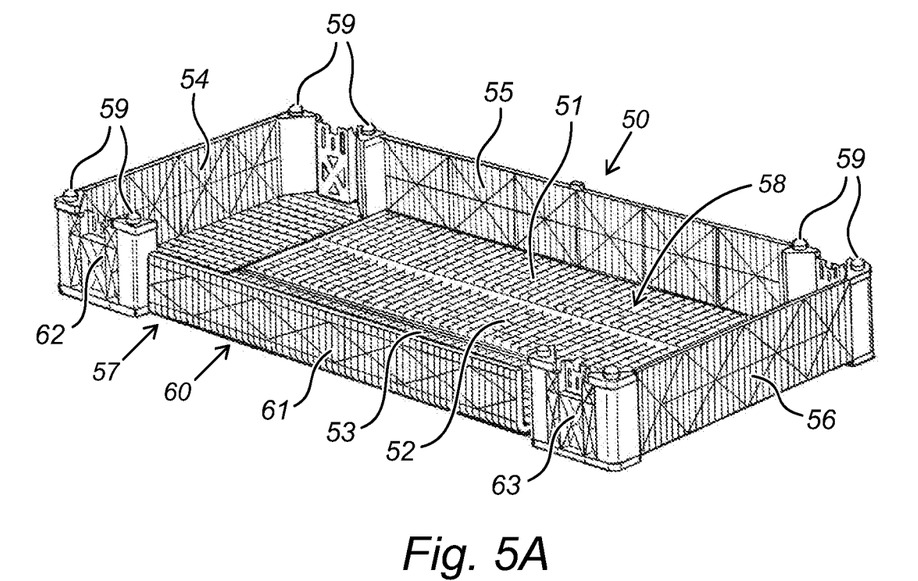
FIGS. 5A-5B show perspective views of an alternative embodiment of a container segment according the present invention in a situation with a closed door and a situation with an opened door.

FIG. 5A shows a container segment 50 with a bottom wall 51 wherein a part of the bottom wall is formed by two bottom wall door segments 52, 53. Four side walls 54-57 protrude from the bottom wall 51; two side walls 54, 56 on the short side of the container segment 50 and two sidewalls 55, 57 on the long side of the container segment 50. All the side walls 54-57 are provided with apertures to enable ventilation of the inner space 58 (the poultry holding volume) of the container segment 50. The container segment 50 is also provided with eight fittings 59 that are constructed to carry the weight of one or more container segments (or container bases) stacked on top of the container segment 50. In the container segment 50 a door 60 is provided which door 60 is formed by a side wall door segment 61 of one 57 of the longer side walls 55, 57 and the two already identified bottom wall door segments 52, 53. The side wall door segment 61 is lower than adjoining parts 62, 63 of the longer side wall 57 that fit to the side wall door segment 61. The door 60 is moveable connected with the rest of the container segment 50 such that the door 60 is displaceable between the position wherein the door 60 fits the rest of the container segment 50 as is shown in FIG. 5A and a position wherein the 60 door leaves an opening in the side wall 57 and the bottom 51 for the passage of poultry as is shown in FIG. 5B.

Figure 5B:
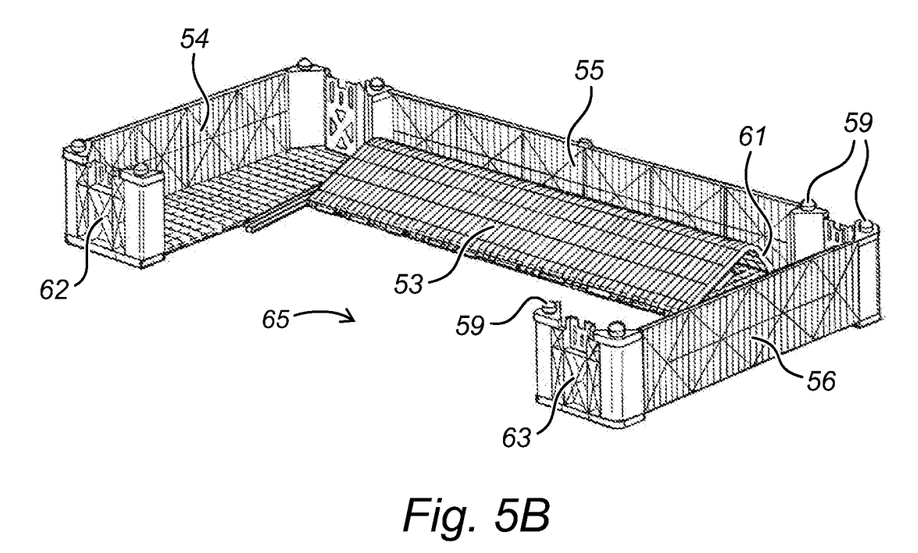

In FIG. 5B the door 60 of container segment 50 is opened providing a poultry loading aperture 65 for the passage of poultry to a (not depicted) container segment or container base. This will further subsequently better clarified in relation to FIG. 6B. The door 60 is partially slid to towards the long sidewalls 55 and bottom wall door segment 53 including side wall door segment 61 are pivoted inwardly resulting in the folded position of the door 60 as depicted.

Figure 6A:
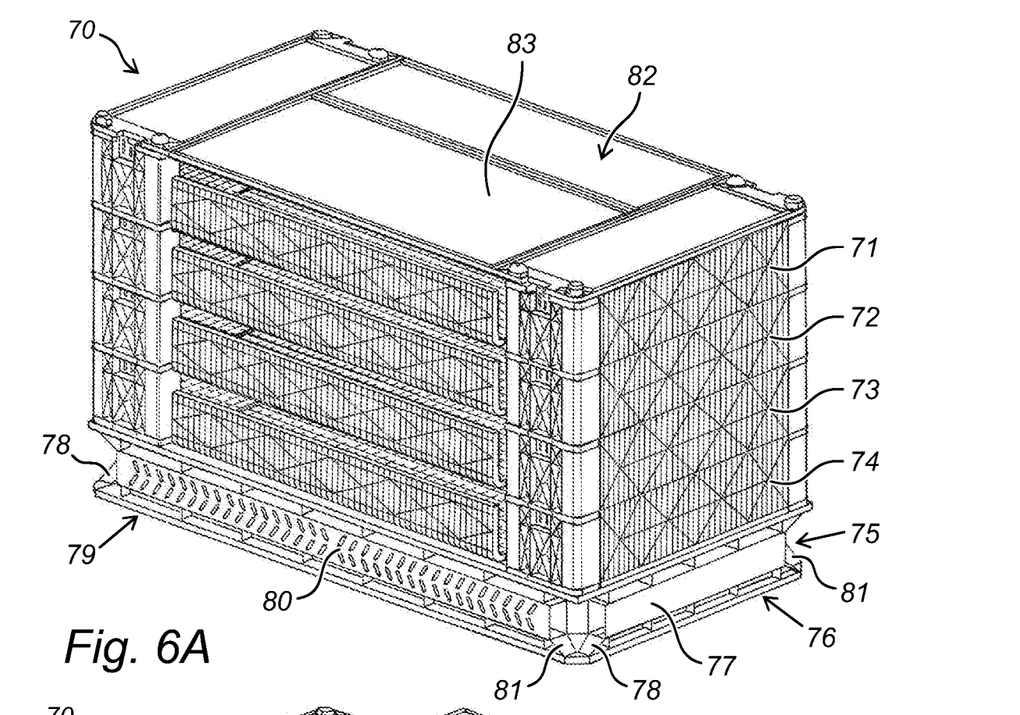
FIGS. 6A-6B shows a perspective view of an alternative embodiment of a container assembly according the present invention in a situation with closed doors and a situation with opened doors.

FIG. 6A shows an assembly 70 of four container segments 71-74 subsequently stacked on top of a container base 75. The container base 75 has two parallel first short side walls 76 formed by two parallel sockets 77 on the open ends of which bevelled guide surfaces 78 help to guide lifting forks into the sockets 77. Also two parallel second long side walls 79 are formed by two parallel sockets 80 on the open ends of which bevelled guide surfaces 81 help to guide lifting forks into. On top of the highest container segment 71 a container cover 82 is placed that incorporates also a door segment 83 to enable loading of the container segment 71 while it is partially covered. The fittings 59 of upper container segment 71 are left free by the container cover 82. FIG. 6A shows the assembly 70 in a closed position, in which closed position it enables the transportation of poultry (not depicted here) loaded in the container base 75 and container segments 71-74.

Figure 6B:
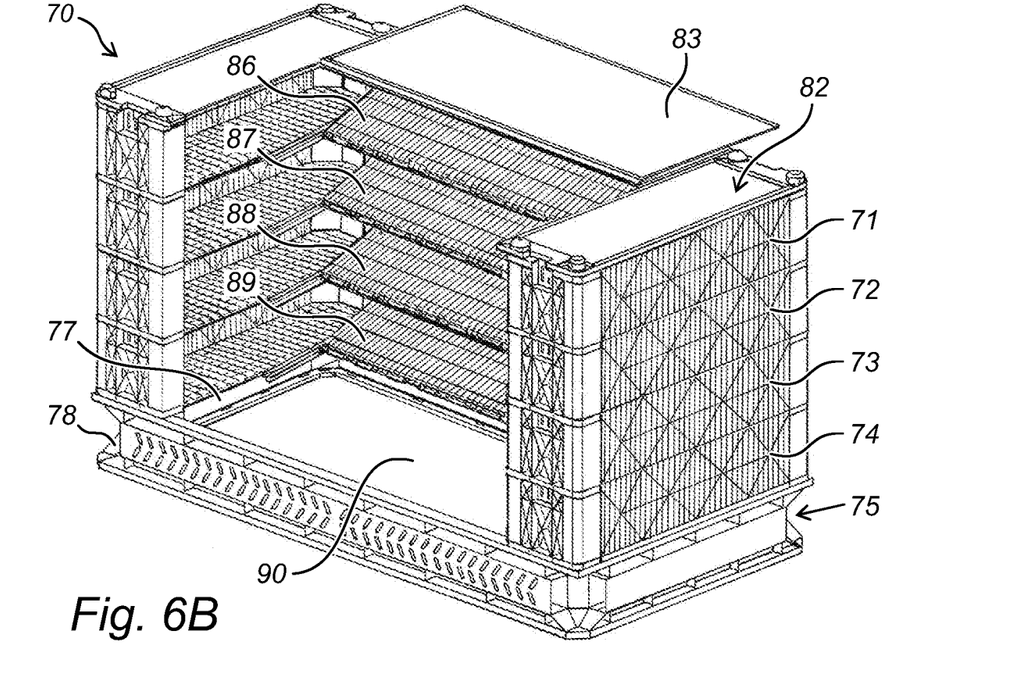

For loading the assembly 70 of container base 75 and container segments 71-74 in FIG. 6B the situation is depicted wherein doors 86-89 of the container segments 71-74 as well as the door segment 83 of container cover 82 are all opened. The opened doors 82, 86-89 enable direct access to the container base 75, loading volume 90 of which may now be loaded by poultry. After the loading volume 90 of the container base 75 is loaded with poultry the door 89 container segment 74 may be closed to enable loading of the container segment 74. Subsequently all the container segments 71-74 may be loaded and after loading the upper container segment 74 the door segment 83 of container cover 82 may be closed to come to the situation as depicted in FIG. 6A.

The invention claimed is:

1. A container segment for holding live poultry, the container segment comprising:
   a bottom wall and four side walls protruding from the bottom wall, the four side walls including a first side wall and three uniform solid constructed side walls;

wherein the container segment is provided with a door,
wherein the door is formed by a section of the first side wall and a door section of the bottom wall, the bottom wall including the door section of the bottom wall and a remaining section of the bottom wall that is the rest of the bottom wall, the section of the first side wall being rigidly connected to the door section of the bottom wall at a fixed angle relative to the door section of the bottom wall,
wherein the door is movably connected with the rest of the container segment such that the door is displaceable between
a first position wherein the door fits the rest of the container segment in a closed position, and
a second position wherein the door provides an opening in the first side wall and the bottom wall for the passage of poultry,
wherein the container segment comprises coupling parts on a top and a bottom thereof respectively such that the container segment is couplable by stacking with another similar container segment having corresponding coupling parts.

2. The container segment according to claim 1, wherein the width of the door is at least 50% of the corresponding width of the side wall wherein the door is installed.

3. The container segment according to claim 1, wherein the door is centrally located in the side wall wherein the door is installed.

4. The container segment according to claim 1, wherein a depth of the door section of the bottom wall from the section of the first side wall to the edge of the remaining section of the bottom wall in a direction within the plane of the bottom wall is at least 50% of a corresponding depth of the container segment.

5. The container segment according to claim 1, wherein the door is slidably connected with the rest of the bottom wall.

6. The container segment according to claim 1, wherein the rest of the bottom wall is provided with door holding guides that provide for sliding of the door in relation to the rest of the bottom wall.

7. The container segment according to claim 1, wherein the bottom wall section of the door is assembled from at least two telescopic door bottom units.

8. The container segment according to claim 1, wherein the bottom wall of the container segment may be provided with a structure of ridges.

9. The container segment according to claim 1, wherein the side wall section of the door of the container segment is provided with a least one coupling part that cooperates with side wall parts of the rest of the container segment.

10. The container segment according to claim 1, wherein at least a part of the door section of the bottom wall is slideably connected to the remaining section of the bottom wall.

11. The container segment according to claim 1, wherein the container segment is a separable containing segment configured to be coupled with the coupling parts with a plurality of similar container segments by stacking without a support structure additional to the plurality of such container segments.

12. A container cover configured to screen off a container segment according to claim 1.

13. A container base for holding live poultry, the container base being configured to have the container segment of claim 1 stacked thereon, the container base comprising:
two mutual first side walls formed by two parallel sockets, which sockets are both provided with at least one open end side;
two mutual parallel second side walls connecting on opposite sides to the two parallel sockets; and
a bottom wall connected to the sockets and the side walls, such that the sockets and the side walls are protruding from the bottom wall to surround a poultry holding volume.

14. The container base according to claim 13, wherein also the second side walls are formed by two parallel sockets.

15. The container base according to claim 13, wherein the sockets are constructed of metal.

16. The container base according to claim 13, wherein the side walls faces away from the bottom are provided with a support edge for carrying an upper part.

17. A container assembly for holding live poultry, comprising a container base and at least one container segment according to claim 13 for holding live poultry.

18. A container assembly according to claim 17, wherein the container assembly comprises at least two container segments, a first container segment placed on top of the container base and subsequent container segments on top of an underlying container segments.

19. A container assembly according to claim 17, wherein the container assembly also comprises a container cover to screen off a container segment, which container cover is placed on top of the upper container segment of the container assembly.

20. A method for loading a container assembly according to claim 17, comprising the method steps:
A) placing an empty container segment on an empty container base;
B) placing one or more subsequent empty container segments on a top empty container segment;
C) placing the doors of all the container segments stacked onto the container base in the position wherein the doors leave an opening in the side walls and the bottoms of the stacked empty container segments for the passage of poultry;
D) loading live poultry through the opening in the side walls and the bottoms of the stacked container segments into the container base;
E) placing the door of the lower container segment in the position wherein it fits the rest of the container segment;
F) loading live poultry through the remaining opening in the side walls and the bottoms of the container segments in the lower container segment with the closed door;
G) repeating the method steps E) and F) until all the doors of the container segments are closed and the container segments are loaded with live poultry; and
H) closing off the upper container segment.

21. The method for loading a container assembly according to claim 20, also comprising the method steps:
J) loading live poultry in the upper container segment; and
K) placing a cover on the loaded upper container segment.

* * * * *